United States Patent
Tang et al.

(12)

(10) Patent No.: US 11,794,212 B2
(45) Date of Patent: Oct. 24, 2023

(54) CROSS BELT SORTING TROLLEY

(71) Applicant: KENGIC INTELLIGENT TECHNOLOGY CO., LTD., Qingdao (CN)

(72) Inventors: Bing Tang, Qingdao (CN); Jinfei Xiao, Qingdao (CN); Chunyang Huang, Qingdao (CN); Mengteng Li, Qingdao (CN); Xiaofen Yao, Qingdao (CN); Shengguang Zou, Qingdao (CN)

(73) Assignee: KENGIC INTELLIGENT TECHNOLOGY CO., LTD., Qingdao (CN)

( * ) Notice: Subject to any disclaimer, the term of this patent is extended or adjusted under 35 U.S.C. 154(b) by 30 days.

(21) Appl. No.: 17/781,728

(22) PCT Filed: Jun. 12, 2020

(86) PCT No.: PCT/CN2020/095700
§ 371 (c)(1),
(2) Date: Jun. 2, 2022

(87) PCT Pub. No.: WO2021/237810
PCT Pub. Date: Dec. 2, 2021

(65) Prior Publication Data
US 2023/0001452 A1  Jan. 5, 2023

(30) Foreign Application Priority Data

May 29, 2020 (CN) .......................... 202010473241.3

(51) Int. Cl.
*B65G 47/96* (2006.01)
*B07C 3/08* (2006.01)
*B07C 5/36* (2006.01)

(52) U.S. Cl.
CPC .................. *B07C 3/08* (2013.01); *B07C 5/36* (2013.01); *B65G 47/96* (2013.01)

(58) Field of Classification Search
CPC .. B07C 5/36; B07C 3/082; B07C 3/08; B65G 2207/18; B65G 47/96; B65G 21/06;
(Continued)

(56) References Cited

FOREIGN PATENT DOCUMENTS

| CN | 106622983 A | | 5/2017 |
|---|---|---|---|
| CN | 106622983 A | * | 5/2017 |

(Continued)

*Primary Examiner* — Gene O Crawford
*Assistant Examiner* — Muhammad Awais
(74) *Attorney, Agent, or Firm* — Bayramoglu Law Offices LLC (57) ABSTRACT

A cross belt sorting trolley is provided, including an upper conveying unit and a lower frame. A folding plate is horizontally mounted on a side of each side plate. A first bending connecting plate or a second bending connecting plate is vertically connected to the side of each side plate. The folding plate is an integral horizontal plate-like component. A plurality of uniform circular arc-shaped sections are arranged on an outer side edge of the folding plate. The plurality of uniform circular arc-shaped sections of folding plates on both sides of the cross belt sorting trolley engage with each other. A plurality of folding plate fixing plates are mounted on a side portion of each side plate. The plurality of folding plate fixing plates are provided with bending portions. Side portions of the plurality of folding plate fixing plates are fixedly connected to side plates.

6 Claims, 5 Drawing Sheets

(58) Field of Classification Search
CPC ...... B65G 15/24; B65G 41/008; B65G 41/02; B65G 47/52; B65G 2201/0285
USPC .............................. 209/509, 707; 198/370.06
See application file for complete search history.

(56) References Cited

FOREIGN PATENT DOCUMENTS

| CN | 107089472 | A | * | 8/2017 | | |
|----|-----------|---|---|--------|---|---|
| CN | 206485919 | U | | 9/2017 | | |
| CN | 206485919 | U | * | 9/2017 | | |
| CN | 206615745 | U | * | 11/2017 | | |
| CN | 206615745 | U | | 11/2017 | | |
| CN | 206798465 | U | * | 12/2017 | | |
| CN | 207174684 | U | | 4/2018 | | |
| CN | 108584327 | A | | 9/2018 | | |
| CN | 207932515 | U | | 10/2018 | | |
| CN | 108946002 | A | * | 12/2018 | | |
| CN | 208292126 | U | * | 12/2018 | | |
| CN | 208377760 | U | * | 1/2019 | | |
| CN | 208377760 | U | | 1/2019 | | |
| CN | 109956282 | A | * | 7/2019 | | |
| CN | 109956282 | A | | 7/2019 | | |
| CN | 110077793 | A | * | 8/2019 | ............... | B07C 5/34 |
| CN | 110180792 | A | * | 8/2019 | | |
| CN | 209226024 | U | * | 8/2019 | | |
| CN | 110605243 | A | | 12/2019 | | |
| CN | 210437918 | U | | 5/2020 | | |
| CN | 210557477 | U | | 5/2020 | | |
| CN | 210557477 | U | * | 5/2020 | | |
| CN | 210593839 | U | | 5/2020 | | |
| CN | 210635199 | U | | 5/2020 | | |
| CN | 111590314 | A | | 8/2020 | | |
| GB | 2300612 | A | | 11/1996 | | |
| JP | 2018122988 | A | | 8/2018 | | |
| RU | 2043280 | C1 | | 9/1995 | | |

* cited by examiner

CROSS BELT SORTING TROLLEY

CROSS REFERENCE TO THE RELATED APPLICATIONS

This application is the national stage entry of International Application No. PCT/CN2020/095700, filed on Jun. 12, 2020, which is based upon and claims priority to Chinese Patent Application No. 202010473241.3, filed on May 29, 2020, the entire contents of which are incorporated herein by reference.

TECHNICAL FIELD

The invention relates to a sorting trolley applied to a vertical cross belt sorting system, belonging to the technical field of logistics sorting.

BACKGROUND

At a current logistics sorting operation site of e-commerce and express delivery industries, sorting trolleys are usually used to carry out operations such as automatic transportation, sorting and rechecking of goods. The traveling trolleys carrying goods are circularly transported on a conveyor line to realize quick sorting, loading and unloading of goods.

In Patent Application No.CN2019211804902 and entitled "Combined Sorting Trolley" previously applied for by the applicant, an upper conveying assembly and a lower frame assembly are provided. The conveying assembly comprises two groups of conveying units which are independently arranged in parallel. An organ-like cover is connected to the same side of the two groups of conveying units. By adoption of the one-trolley-and-double-conveying modular structure design, two small packages can be conveyed at the same time and are then sorted to two sides, or one large package can be conveyed by two conveying units and is then sorted and unloaded to the same side synchronously. The parallel conveying units are separately mounted and connected to the frame assembly and are electrically controlled separately.

With the improvement of the efficiency of on-site sorting operation, horizontal circular cross belt sorting equipment is usually adopted at present, or a vertical circular cross belt sorting system is adopted due to the limited site space. In this regard, the above-mentioned prior application has the following obvious limitations: (1) the overall structure is complex and heavy, which is not conducive to improving the operation efficiency of the existing cross belt sorting system; (2) the number of components is large, the manufacturing cost is high, and due to the limitation of machining precision, the overall installation and debugging accuracy of the trolley is low; (3) the complicated connection between components directly affects the overall running stability of the trolley; and (4) the working noise is large, which is not conducive to improving the operating environment of the site.

In view of this, this patent application is hereby filed.

SUMMARY

To solve the above-mentioned problems existing in the prior art, a cross belt sorting trolley of the invention is structurally improved by adopting a modular upper conveying unit and a modular lower frame of the trolley, and using grouping opposing connection modules in terms of the interconnection construction of the upper conveying unit and the lower frame, which improves the mounting stability and the accuracy of the assembly and disassembly of module structures of assemblies, simplifies the disassembly operation efficiency, and reduces the abrasion between components, and the operating noise.

In order to achieve the above design purpose, the cross belt sorting trolley comprises an upper conveying unit and a lower frame, the upper conveying unit comprises a belt supporting plate and side plates connected to both sides of the belt supporting plate, two ends of each side plate are respectively provided with an unpowered roller and a powered roller, and a sorting belt is wound on the belt supporting plate, the unpowered rollers and the powered rollers. The differences from the prior art lie in that a folding plate is horizontally mounted on a side of each side plate, and a first bending connecting plate or a second bending connecting plate is vertically connected to the side of each side plate; the folding plate is an integral horizontal plate-like component, a plurality of uniform circular arc-shaped sections are arranged on an outer side edge of the folding plate, and the circular arc-shaped sections of the folding plates on both sides of the same sorting trolley engage with each other; a plurality of groups of folding plate fixing plates are mounted on a side portion of the side plate, the folding plate fixing plates are provided with bending portions, side portions of the folding plate fixing plates are fixedly connected to the side plates, and horizontal tops of the folding plate fixing plates are fixedly connected to the folding plate; and the first bending connecting plate and the second bending connecting plate are respectively connected to side plates on one side, and the bottom of the first bending connecting plate and the bottom of the second bending connecting plate are respectively provided with a first mounting hole and a second mounting hole for connection with the lower frame.

Further, a plurality of groups of tie rods are transversely connected between the side plates on both sides.

Further, the lower frame comprises a trolley frame, walking wheel assemblies and guide wheel assemblies connected to the trolley frame, a knuckle bearing assembly and a secondary plate. The trolley frame is of a T-shaped integral structure, and comprises a horizontal part and a vertical part, and transition parts which are punch-formed as a whole are arranged on two sides of a joint between of horizontal part and the vertical part; a plurality of continuous circular arc parts are arranged at an outer edge of the horizontal part; and an oblong slot is longitudinally formed along the vertical part of the trolley frame, and a plurality of sets of inner threaded holes and outer positioning holes are arranged inside and outside the oblong slot.

Further, a trolley joint plate is installed at an end of the vertical part of the trolley frame, and the trolley joint plate comprises an A-shaped joint plate body, and lugs extending outwards in two directions welded on two sides of the joint plate body; a front end of the joint plate body is provided with a round bearing hole, both sides of the joint plate body are provided with at least two groups of side round holes, and a middle connection position of the joint plate body is provided with a middle round hole; the lugs on both sides are respectively provided with at least two groups of vertical round holes to be connected to the first mounting hole in the bottom of the first bending connecting plate; and the horizontal part of the trolley frame is provided with a plurality of vertical mounting holes to be connected to the second mounting hole in the bottom of the second bending connecting plate.

Further, the walking wheel assemblies and the guide wheel assemblies are arranged at both ends of the horizontal part of the trolley frame through pins respectively, and both sides of the knuckle bearing assembly are connected to a lateral center of the horizontal part through bolts.

Specifically, a first cushion block, a first check washer, a second cushion block and a second check washer are disposed around each pin inside the trolley frame, and a first nut and a second nut are additionally installed on the top of the pin.

An electrical control box mounting piece is installed on the top of the vertical part of the trolley frame, and an end of the electrical control box mounting piece is provided with a positioning hole to be connected to a vertical positioning hole in the vertical part of the trolley frame.

The electrical control box mounting piece is provided with an oblong hole matched with the vertical positioning hole in the vertical part, and the electrical control box mounting piece is welded with a plurality of groups of small round plates with threaded holes and provided with side openings in a side portion.

To sum up, the cross belt sorting trolley of the application has the following advantages:
1. The overall structure of the sorting trolley is compact, the degree of light weight is improved, the assembly and debugging accuracy is correspondingly improved, and the modular structure and assembly are conductive to reducing the on-site maintenance difficulty and manufacturing cost.
2. The overall connection and installation structure is effectively simplified, which is conducive to improving the operation efficiency of the cross belt sorting system.
3. Through the optimized structure and assembly method, the overall number of trolleys can be reduced, and components can be connected more accurately, which can make up for the limitation of machining accuracy and improve the installation and debugging accuracy on the whole.
4. With the improvement of installation and positioning accuracy between components, the overall running stability of the trolley can be improved.
5. Current connection structures such as an organ-like cover are omitted, so as to effectively reduce the working noise caused by mutual abrasion, which is conducive to improving the operating environment on site.

BRIEF DESCRIPTION OF THE DRAWINGS

The application will now be further explained with reference to the following drawings.

In the above drawings: sorting belt 1, belt supporting plate 2, unpowered roller 3, power roller 4, side plate 5, folding plate fixing plate 6, folding plate 7, first bending connecting plate 8, second bending connecting plate 9, tie rod 10, trolley frame 11, trolley joint plate 12, walking wheel assembly 13, guide wheel assembly 14, knuckle bearing assembly 15, secondary plate 16, electrical control box mounting piece 17;

upper conveying unit 100, second mounting hole 101, folding plate fixing hole 102, circular arc-shaped section 103, countersunk screw 104, fixing plate mounting hole 105, first mounting hole 108, horizontal part 110, vertical part 111;

lower frame 200, vertical mounting hole 201, circular arc part 202, transition part 203, oblong slot 204, inner threaded hole 205, outer positioning hole 206, side threaded hole 207, end threaded hole 208, vertical positioning hole 209, round bearing hole 210, side round hole 211, middle round hole 212, vertical round hole 213, joint plate body 214, first cushion block 215, second cushion block 216, first check washer 217, second check washer 218, first nut 219, second nut 220;

lug 300, positioning hole 301, oblong hole 302, small round plate 303, side opening 304.

DETAILED DESCRIPTION OF THE EMBODIMENTS

Figure 1:
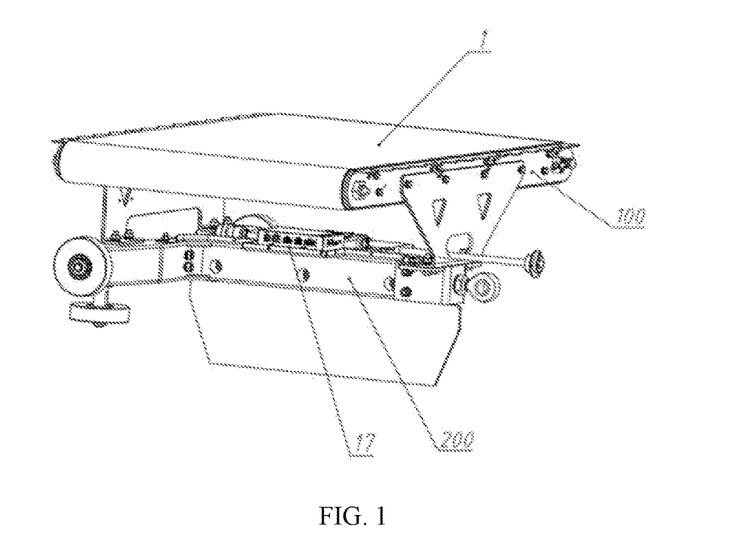
FIG. 1 is a diagram of the overall structure of a cross belt sorting trolley described in this application.
Figure 2:
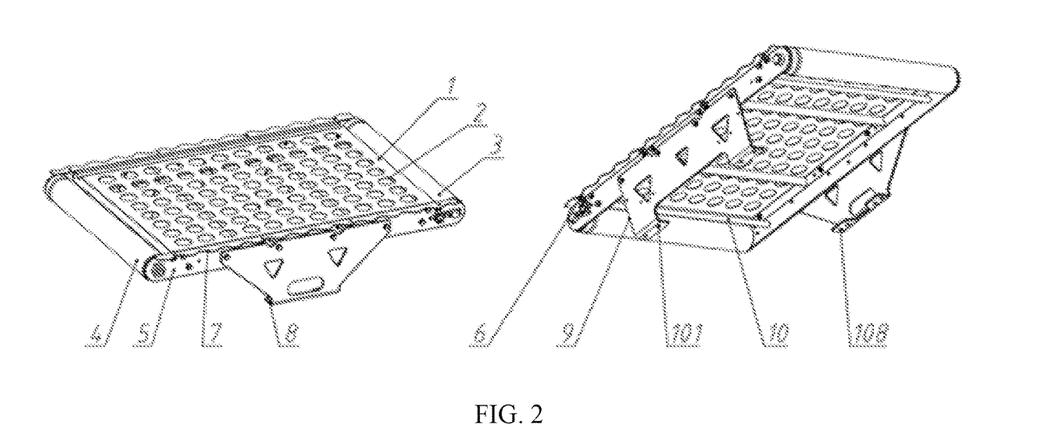
FIG. 2 is a structural comparison diagram of an upper conveying unit from two observation angles.
Figure 3:
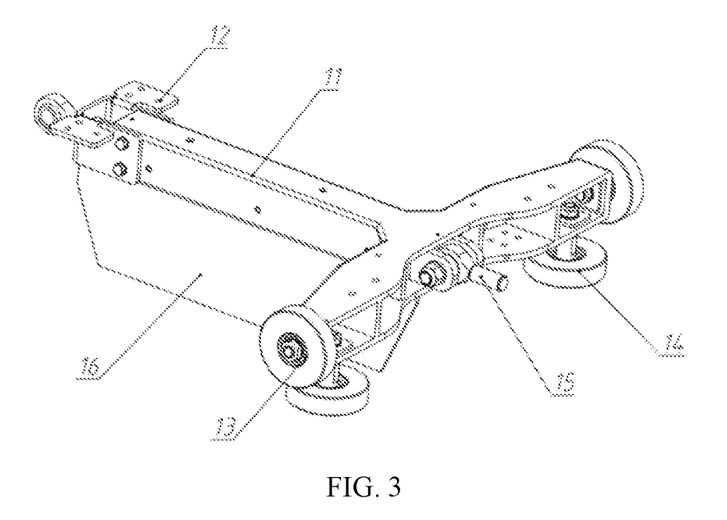
FIG. 3 is a structural diagram of a lower frame.

In Embodiment 1, as shown in FIGS. 1-3, the cross belt sorting trolley is of an integral structure formed by connection of two modular structures, and comprises an upper conveying unit 100 and a lower frame 200.

The upper conveying unit 100 comprises a belt supporting plate 2 and side plates 5 connected to both sides of the belt supporting plate 2. Two ends of each side plate 5 are respectively provided with an unpowered roller 3 and a powered roller 4. A sorting belt 1 is wound on the belt supporting plate 2, the unpowered rollers 3 and the powered rollers 4. Power transmitted by the powered rollers 4 drives the sorting belt 1 to reciprocate in two directions on the belt supporting plate 2 to carry out different sorting actions.

A folding plate 7 is horizontally mounted on a side of each side plate 5. A first bending connecting plate 8 or a second bending connecting plate 9 is vertically connected to the side of each side plate 5.

Figure 4:
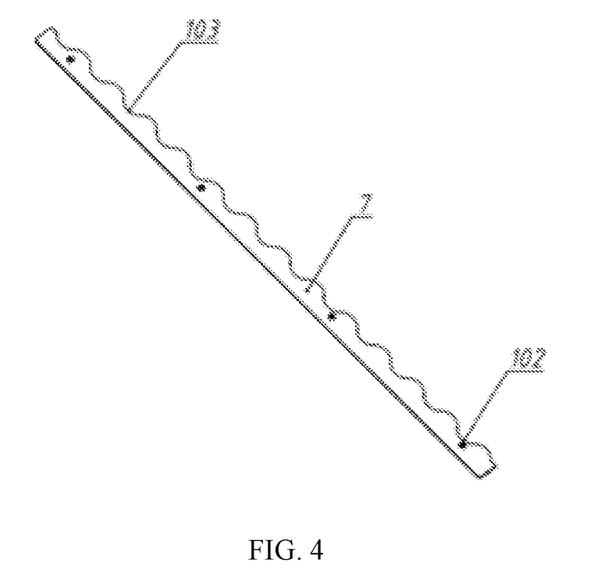
FIG. 4 is a structural diagram of a folding plate.
Figure 5:
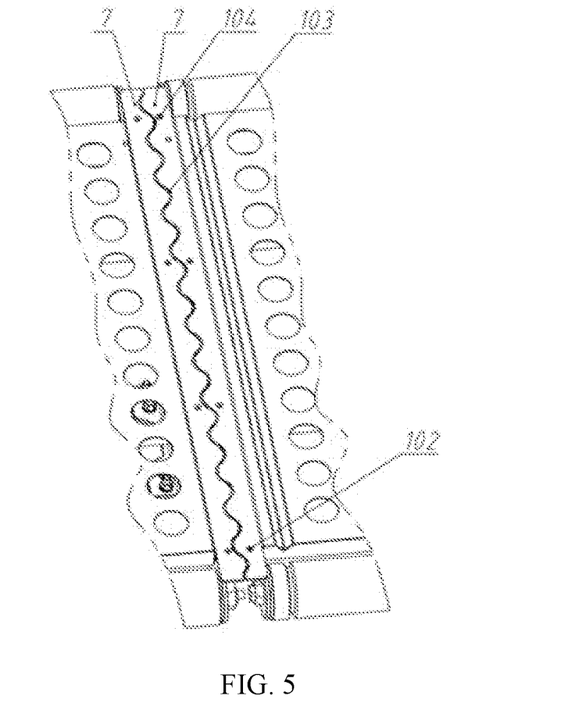
FIG. 5 is a diagram showing the abutment of folding plates of front and rear trolleys.

Specifically, as shown in FIG. 4, the folding plate 7 is an integral horizontal plate-like component, and a plurality of uniform circular arc-shaped sections 103 are arranged on an outer side edge of the folding plate. As shown in FIG. 5, the circular arc-shaped sections 103 of the folding plates 7 on both sides of the same sorting trolley engage with each other. That is, when two sorting trolleys with one in front of the other are connected in series with each other, the circular arc-shaped sections 103 of the folding plates 7 of the sorting trolleys engage with certain gaps reserved, which can replace an organ-like cover component currently used. In this way, the sorting trolleys are effectively connected, goods are prevented from falling between the sorting trolleys, noise caused by the stretching or twisting of the organ-like cover during the operation of the trolley is avoided, and the mechanical strength at a joint of the front and rear trolleys is improved.

Figure 6:
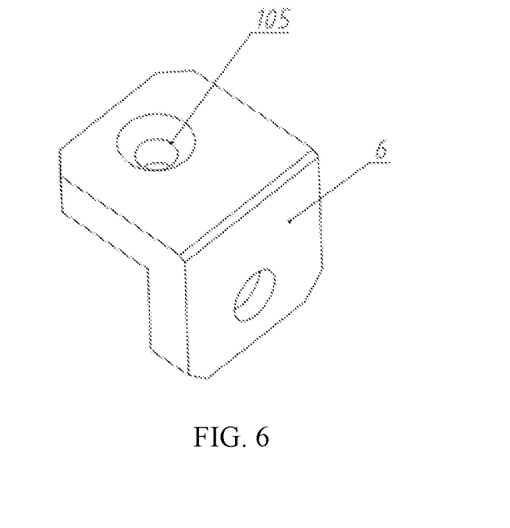
FIG. 6 is a structural diagram of a folding plate fixing plate.

The folding plate 7 is provided with a plurality of folding plate fixing holes 102, and as shown in FIGS. 4 and 6, a plurality of groups of folding plate fixing plates 6 with fixing plate mounting holes 105 are mounted on a side portion of the side plate 5. The folding plate fixing holes 102 are in butt joint with the fixing plate mounting holes 105, and then the folding plates 7 and the folding plate fixing plates 6 are fixedly connected by countersunk screws 104.

As shown in FIG. 6, the folding plate fixing plates 6 are provided with bending portions, side portions of the folding plate fixing plates are fixedly connected to the side plates 5 through bolts, and horizontal tops of the folding plate fixing plates are respectively fixed by bolts penetrating through the folding plate fixing holes 102 and the fixing plate mounting holes 105, so that the folding plate 7 is fixed horizontally.

As shown in FIG. 2, a plurality of groups of tie rods 10 are transversely connected between the side plates 5 on both sides to enhance the stability of the basic frame structure of the upper conveying unit 100 composed of the belt supporting plate 2 and the side plates 5. That is, from the outside of the side plates 5, both ends of each tie rod 10 are fixedly connected to the side plates 5 by bolts.

The first bending connecting plate 8 and the second bending connecting plate 9 are respectively connected to side plates 5 on one side. The bottom of the first bending connecting plate 8 and the bottom of the second bending connecting plate 9 are respectively provided with a first mounting hole 108 and a second mounting hole 101 for connection with the lower frame 200. The upper conveying unit 100 and the lower frame 200 are stably connected by bolts to form the whole sorting trolley.

Figure 7:
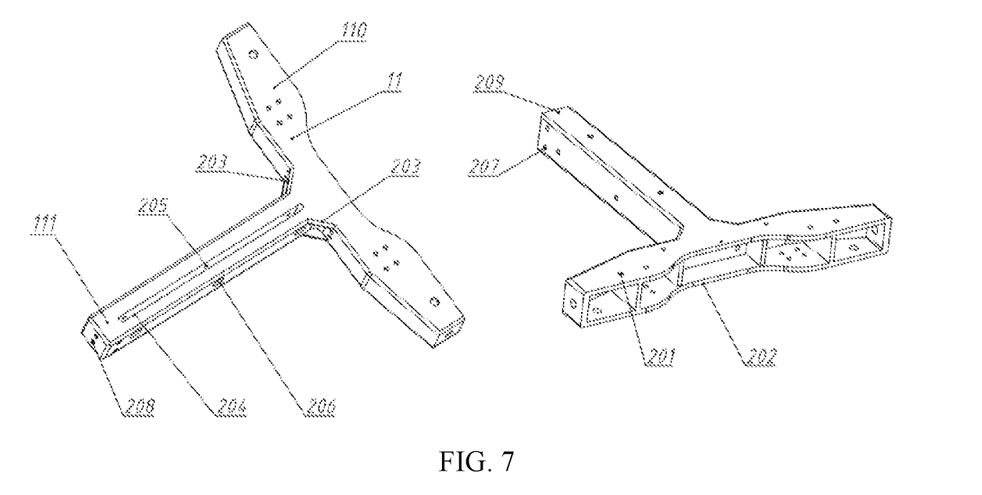
FIG. 7 is a structural comparison diagram of a trolley frame from two observation angles.

As shown in FIGS. 3 and 7, the lower frame 200 is provided with a trolley frame 11, a trolley joint plate 12 connected to the trolley frame 11, at least two sets of walking wheel assemblies 13 and guide wheel assemblies 14, a knuckle bearing assembly 15, a secondary plate 16 and an electrical control box mounting piece 17.

The trolley frame 11 is of a T-shaped integral structure, and comprises a horizontal part 110 and a vertical part 111.

A plurality of continuous circular arc parts 202 are arranged at an outer edge of the horizontal part 110. The circular arc parts 202 not only can improve the local stress dispersion to improve the tensile strength of the horizontal part 110, but also can improve the connection strength with the vertical part 111.

The trolley frame 11 is a cast component as a whole, and two sides of a joint of the horizontal part 110 and the vertical part 111 are main stress areas. In order to improve the mechanical strength of the joint area, one improvement measure is that transition parts 203 are connected between the horizontal part 110 and the vertical part 111, and the transition parts 203 are punch-formed to form an integrated structure with the horizontal part 110 and the vertical part 111. Through the transition parts 203, external forces on the horizontal part 110 and the vertical part 111 may be dispersed and balanced, so as to improve the rigidity and strength of the whole trolley frame 11.

An oblong slot 204 is longitudinally formed along the vertical part 111 of the trolley frame 11, a plurality of sets of inner threaded holes 205 and outer positioning holes 206 are arranged inside and outside the oblong slot 204, and the secondary plate 16 inserted into the oblong slot 204 is locked and fixed by bolts penetrating through the threaded holes 205 and outer positioning holes 206 from outside to inside.

Specifically, the secondary plate 16 is inserted into the oblong slot 204 first, then the bolts are made to pass through the outer positioning holes 206 with front ends of the bolts being pushed into the inner threaded holes 205, so that the bolts press the inner side face of the secondary plate 16 towards the side wall of the oblong slot 204 from outside to inside, and then the bolts are tightened to finally hold the secondary plate 16 tightly against the inner side face of the oblong slot 204, realizing the installation of the secondary plate 16 and clearance adjustment. The above-mentioned installation structure and method not only can facilitate personnel practice and improve the positioning accuracy, but also can complete the installation and debugging of the secondary plate 16 with high accuracy requirements by means of simple steps, thus improving the operation accuracy of an electrical control system of the sorting trolley.

Figure 8:
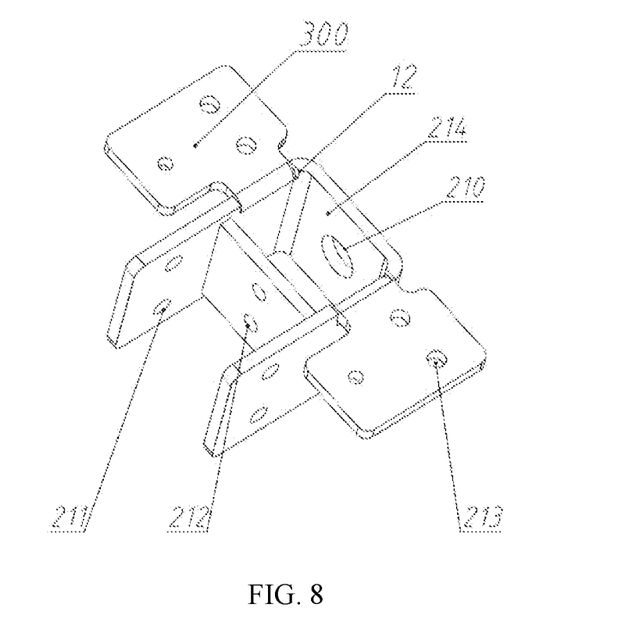
FIG. 8 is a structural diagram of a trolley joint plate.

As shown in FIG. 8, in order to further improve the connection stability between the trolley frame 11 and the upper conveying unit 100, the trolley joint plate 12 may be installed at an end of the vertical part 111 of the trolley frame 11.

The trolley joint plate 12 is an integral welded piece, and two sides of an A-shaped joint plate body 214 are welded with lugs 300 extending outwards in two directions. A front end of the joint plate body 214 is provided with a round bearing hole 210, so as to be fixedly connected to a bearing tail shaft of the knuckle bearing assembly 15. Both sides of the joint plate body 214 are provided with at least two groups of side round holes 211, so as to be connected to side threaded holes 207 provided on the side of the trolley frame 11 by bolts. A middle connection position of the joint plate body 214 is provided with a middle round hole 212, so as to be connected to an end threaded hole 208 at a top end of the trolley frame 11 by a bolt. When the trolley frame 11 is connected to the trolley joint plate 12, the end threaded hole 208 positions and tightens the trolley frame 11 and the upper conveying unit 100.

The lugs 300 on both sides are respectively provided with at least two groups of vertical round holes 213, so as to be connected and fixed to the first mounting hole 108 in the bottom of the first bending connecting plate 8 by a bolt. Correspondingly, the horizontal part 110 of the trolley frame 11 is provided with a plurality of vertical mounting holes 201, so as to be connected and fixed to the second mounting hole 101 in the bottom of the second bending connecting plate 9 by a bolt.

Figure 9:
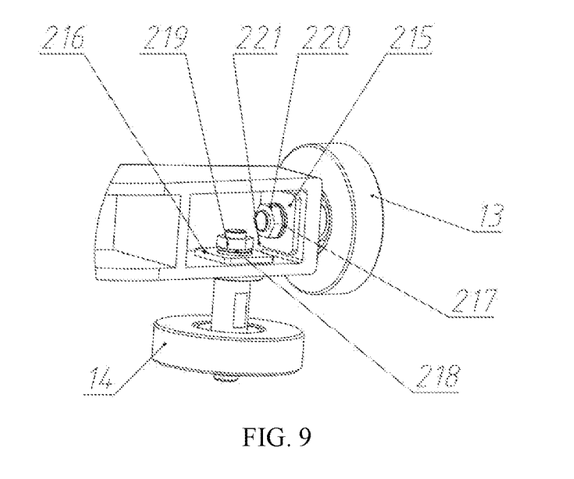
FIG. 9 is a diagram showing the fixed connection of walking wheel assemblies, guide wheel assemblies and a trolley frame.

As shown in FIGS. 3 and 9, the two sets of walking wheel assemblies 13 and guide wheel assemblies 14 are arranged at both ends of the horizontal part 110 of the trolley frame 11 through pins respectively, and both sides of the knuckle bearing assembly 15 are connected to a lateral center of the horizontal part 110 through bolts.

In order to reduce the weight of the sorting trolley, the trolley frame 11 is usually an aluminum casting part. When the walking wheel assemblies 13 and the guide wheel assemblies 14 travel on a track surface, pins inside wheelset assemblies and the trolley frame 11 will rotate relative to each other, resulting in abnormal wear on the trolley frame 11. In view of this, the solution adopted by this application is that a first cushion block 215, a first check washer 217, a second cushion block 216 and a second check washer 218 are disposed around the pin inside the trolley frame 11, and a first nut 219 and a second nut 220 are additionally installed on the top of the pin. Through the check washers and the nuts, the two groups of cushion blocks can be pressed against the inner side face of the trolley frame 11. When the pins at the axes of the walking wheel assemblies 13 and the guide wheel assemblies 14 rotate axially, the first cushion block 215 and the second cushion block 216 will rotate accordingly by a certain angle, and then outer corners 221 of the first cushion block 215 and the second cushion block 216 will be squeezed against the inner side wall of the trolley frame 11 and get stuck; and at this point, the first cushion block 215 and the second cushion block 216 are unable to rotate any more, thus braking the pins at the axes of the walking wheel assemblies 13 and the guide wheel assemblies 14, so that wheelsets of the walking wheel assemblies 13 and the guide wheel assemblies 14 can only idle, avoiding abnormal wear between the pins and the trolley frame 11, and prolonging the service life of the trolley frame 11 made of cast aluminum.

Figure 10:
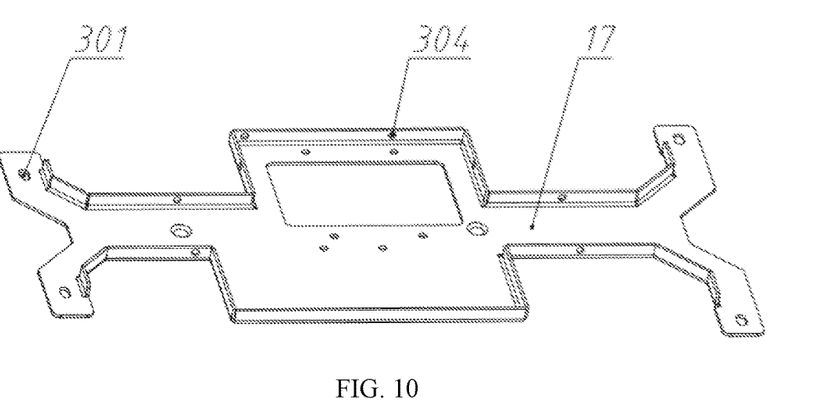
FIG. 10 is a first structural diagram of an electrical control box mounting piece.

As shown in FIGS. 1 and 10, the electrical control box mounting piece 17 is installed on the top of the vertical part 111 of the trolley frame 11. An end of the electrical control box mounting piece 17 is provided with a positioning hole 301, so as to be fixedly connected to a vertical positioning hole 209 in the vertical part 111 of the trolley frame 11 by a bolt. The above structure is suitable for a variety of electrical control box installation modes, which not only simplifies the installation and debugging of different electrical control boxes and the trolley frame 11, but also simplifies assembly and disassembly procedures and saves debugging time.

Figure 11:
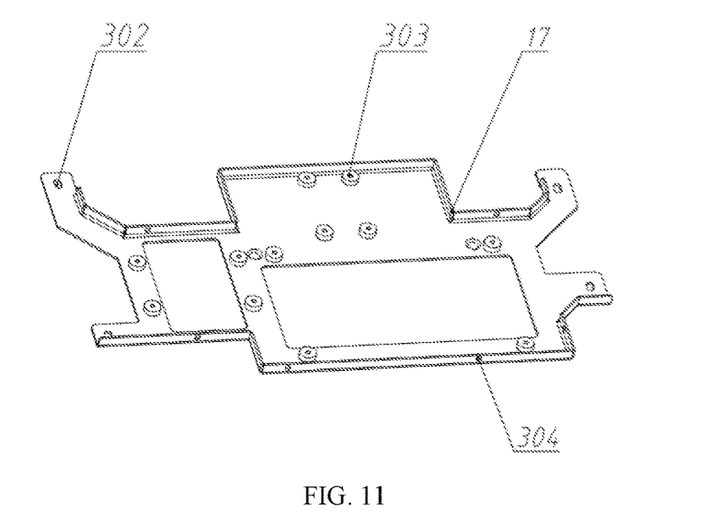
FIG. 11 is a second structural diagram of an electrical control box mounting piece.

As shown in FIG. 11, the electrical control box mounting piece 17 may also be installed in another way, that is, the electrical control box mounting piece 17 is provided with an oblong hole 302 matched with the vertical positioning hole 209 in the vertical part 111, and the oblong hole 302 and the vertical positioning hole 209 are fixedly connected through a bolt.

In addition, the electrical control box mounting piece 17 is welded with a plurality of groups of small round plates 303 with threaded holes and provided with side openings 304 in a side portion to realize the installation and positioning of various special-shaped electrical control boxes. After all the electrical control boxes are installed in place, connection with the above-mentioned trolley frame 11 will be realized as a whole.

On the basis of the above structural design, this application realizes the following assembly method of the sorting trolley.

The sorting trolley is divided into two parts: an upper conveying unit 100 and a lower frame 200. The upper conveying unit 100 and the lower frame 200 are assembled independently and then installed integrally.

The upper conveying unit 100 is a basic frame composed of a belt supporting plate 2 and side plates 5 on both sides. Two ends of each side plate 5 are respectively provided with an unpowered roller 3 and a powered roller 4. A sorting belt 1 is wound on the belt supporting plate 2, the unpowered rollers 3 and the powered rollers 4. Power transmitted by the powered rollers 4 drives the sorting belt 1 to reciprocate in two directions on the belt supporting plate 2 to carry out different sorting actions.

A folding plate 7 is horizontally and fixedly mounted on a side of each side plate 5. A first bending connecting plate 8 and a second bending connecting plate 9 are vertically and fixedly mounted on the side of each side plate 5.

The folding plate 7 is an integral horizontal plate-like component, and a plurality of uniform circular arc-shaped sections 103 are arranged on an outer side edge of the folding plate.

The folding plate 7 is provided with a plurality of folding plate fixing holes 102, and a plurality of groups of folding plate fixing plates 6 with fixing plate mounting holes 105 are mounted on a side portion of the side plate 5. The folding plate fixing holes 102 are in butt joint with the fixing plate mounting holes 105, and then the folding plates 7 and the folding plate fixing plates 6 are fixedly connected by countersunk screws 104.

When two sorting trolleys with one in front of the other are connected in series with each other, the circular arc-shaped sections 103 of the folding plates 7 of the sorting trolleys engage with certain gaps reserved, which can replace an organ-like cover component currently used.

The folding plate fixing plates 6 are provided with L-shaped structures, side portions of the folding plate fixing plates are fixedly connected to the side plates 5 through bolts, and horizontal tops of the folding plate fixing plates are respectively fixed by bolts penetrating through the folding plate fixing holes 102 and the fixing plate mounting holes 105, so that the folding plate 7 is fixed horizontally.

A plurality of groups of tie rods 10 are transversely connected between the side plates 5 on both sides. That is, from the outside of the side plates 5, both ends of each tie rod 10 are fixedly connected to the side plates 5 by bolts.

The first bending connecting plate 8 and the second bending connecting plate 9 are respectively connected to side plates 5 on one side.

The lower frame 200 comprises a trolley frame 11, a trolley joint plate 12 connected to the trolley frame 11, at least two sets of walking wheel assemblies 13 and guide wheel assemblies 14, a knuckle bearing assembly 15, a secondary plate 16 and an electrical control box mounting piece 17.

The trolley frame 11 is of a T-shaped integral structure, and comprises a horizontal part 110 and a vertical part 111.

The trolley frame 11 is a cast component as a whole, and transition parts 203 are arranged on two sides of a joint between the horizontal part 110 and the vertical part 111. The transition parts 203 are punch-formed so as to form an integrated structure with the horizontal part 110 and the vertical part 111.

An oblong slot 204 is longitudinally formed along the vertical part 111 of the trolley frame 11, a plurality of sets of inner threaded holes 205 and outer positioning holes 206 are arranged inside and outside the oblong slot 204, and the secondary plate 16 inserted into the oblong slot 204 is locked and fixed by bolts penetrating through the threaded holes 205 and outer positioning holes 206 from outside to inside.

Specifically, the secondary plate 16 is inserted into the oblong slot 204 first, then the bolts are made to pass through the outer positioning holes 206 with front ends of the bolts being pushed into the inner threaded holes 205, so that the bolts press the inner side face of the secondary plate 16 towards the side wall of the oblong slot 204 from outside to inside, and then the bolts are tightened to finally hold the secondary plate 16 tightly against the inner side face of the oblong slot 204, realizing the installation of the secondary plate 16 and clearance adjustment.

The two sets of walking wheel assemblies 13 and guide wheel assemblies 14 are arranged at both ends of the horizontal part 110 of the trolley frame 11 through pins respectively, and both sides of the knuckle bearing assembly 15 are connected to a lateral center of the horizontal part 110 through bolts.

A first cushion block 215, a first check washer 217, a second cushion block 216 and a second check washer 218 are disposed around each pin inside the trolley frame 11, and a first nut 219 and a second nut 220 are additionally installed on the top of the pin to press the two groups of cushion blocks against the inner side face of the trolley frame 11.

The electrical control box mounting piece 17 is installed on the top of the vertical part 111 of the trolley frame 11. The electrical control box mounting piece 17 is welded with a plurality of groups of small round plates 303 with threaded holes and provided with side openings 304 in a side portion to install electrical control boxes in place.

An end of the electrical control box mounting piece 17 is provided with a positioning hole 301 and an oblong hole 302, which are fixedly connected to a vertical positioning hole 209 in the vertical part 111 of the trolley frame 11 by bolts respectively.

After assembling the upper conveying unit 100 and the lower frame 200 according to the above steps, the bottom of the first bending connecting plate 8 and the bottom of the second bending connecting plate 9 are vertically connected and fixed to the trolley frame 11.

Specifically, the trolley joint plate 12 is installed at the end of the vertical part 111 of the trolley frame 11. The trolley joint plate 12 is an integral welded piece, and two sides of an A-shaped joint plate body 214 are welded with lugs 300 extending outwards in two directions.

A front end of the joint plate body 214 is fixedly connected to a bearing tail shaft of the knuckle bearing assembly 15. Both sides of the joint plate body 214 are connected to a side portion of the trolley frame 11. A middle connection position of the joint plate body 214 is connected to a top end of the trolley frame 11.

The lugs 300 on both sides of the trolley joint plate 12 are connected and fixed to the bottom of the first bending connecting plate 8 in the vertically upward direction, and meanwhile, the horizontal part 110 of the trolley frame 11 is connected and fixed to the bottom of the second bending connecting plate 9 in the vertically upward direction, so that the upper conveying unit 100 and the lower frame 200 are stably connected to form the whole sorting trolley.

To sum up, the embodiments given in conjunction with the accompanying drawings are preferred solutions. Other alternative structures conforming to the design concept of the invention directly deduced by those skilled in the art under the enlightenment of the above embodiments also belong to the scope of the solutions of the invention.

What is claimed is:

1. A cross belt sorting trolley, comprising an upper conveying unit and a lower frame, wherein the upper conveying unit comprises a belt supporting plate and side plates connected to both sides of the belt supporting plate, two ends of each side plate are respectively provided with an unpowered roller and a powered roller, and a sorting belt is wound on the belt supporting plate, the unpowered roller and the powered roller, wherein a folding plate is horizontally mounted on a side of each side plate, and a first bending connecting plate or a second bending connecting plate is vertically connected to the side of each side plate;

the folding plate is an integral horizontal plate-like component, a plurality of uniform circular arc-shaped sections are arranged on an outer side edge of the folding plate, and the circular arc-shaped sections of the folding plates on both sides of the same sorting trolley engage with each other such that when two sorting trolleys with one in front of the other are connected in series with each other, the circular arc-shaped sections of the folding plates of the sorting trolleys engage with certain gaps reserved;

a plurality of groups of folding plate fixing plates are mounted on a side portion of the side plate, the folding plate fixing plates are provided with bending portions, side portions of the folding plate fixing plates are fixedly connected to the side plates, and horizontal tops of the folding plate fixing plates are fixedly connected to the folding plate; and the first bending connecting plate and the second bending connecting plate are respectively connected to the side plates on one side, and a bottom of the first bending connecting plate and a bottom of the second bending connecting plate are respectively provided with a first mounting hole and a second mounting hole for a connection with the lower frame;

wherein a plurality of groups of tie rods are transversely connected between the side plates on both sides;

wherein the lower frame comprises a trolley frame, walking wheel assemblies, guide wheel assemblies, a knuckle bearing assembly and a secondary plate;

the walking wheel assemblies and the guide wheel assemblies are connected to the trolley frame, the trolley frame is of a T-shaped integral structure, and the trolley frame comprises a horizontal part and a vertical part, and transition parts punch-formed as a whole are arranged on two sides of a joint of the horizontal part and the vertical part;

a plurality of continuous circular arc parts are arranged at an outer edge of the horizontal part; and an oblong slot is longitudinally formed along the vertical part of the trolley frame, and a plurality of sets of inner threaded holes and outer positioning holes are arranged inside the oblong slot and outside the oblong slot.

2. The cross belt sorting trolley according to claim 1, wherein a trolley joint plate is installed at an end of the vertical part of the trolley frame, and the trolley joint plate comprises an A-shaped joint plate body, and lugs extending outwards in two directions and welded on two sides of the joint plate body;

a front end of the joint plate body is provided with a round bearing hole, both sides of the joint plate body are provided with at least two groups of side round holes, and a middle connection position of the joint plate body is provided with a middle round hole;

the lugs on both sides are respectively provided with at least two groups of vertical round holes to be connected to the first mounting hole in the bottom of the first bending connecting plate; and the horizontal part of the trolley frame is provided with a plurality of vertical mounting holes to be connected to the second mounting hole in the bottom of the second bending connecting plate.

3. The cross belt sorting trolley according to claim 1, wherein the walking wheel assemblies and the guide wheel assemblies are arranged at both ends of the horizontal part of the trolley frame through pins respectively, and both sides of the knuckle bearing assembly are connected to a lateral center of the horizontal part through bolts.

4. The cross belt sorting trolley according to claim 3, wherein a first cushion block, a first check washer, a second cushion block and a second check washer are disposed around each pin inside the trolley frame, and a first nut and a second nut are additionally installed on a top of the pin.

5. The cross belt sorting trolley according to claim 1, wherein an electrical control box mounting piece is installed on a top of the vertical part of the trolley frame, and an end of the electrical control box mounting piece is provided with a positioning hole to be connected to a vertical positioning hole in the vertical part of the trolley frame.

6. The cross belt sorting trolley according to claim 5, wherein the electrical control box mounting piece is provided with an oblong hole matched with the vertical positioning hole in the vertical part; and the electrical control box mounting piece is welded with a plurality of groups of small round plates with threaded holes and provided with side openings in the side portion.

* * * * *